(12) United States Patent
Szomolányi et al.

(10) Patent No.: US 7,489,772 B2
(45) Date of Patent: Feb. 10, 2009

(54) NETWORK ENTITY, METHOD AND COMPUTER PROGRAM PRODUCT FOR EFFECTUATING A CONFERENCE SESSION

(75) Inventors: Márton Szomolányi, Budapest (HU); Kristóf Aczél, Budapest (HU); Ari Tourunen, Espoo (FI); Jari Mutikainen, Lepsämä (FI); Balázs Bakos, Törökbálint (HU); John Patrick Wong, Vancouver (CA)

(73) Assignee: Nokia Corporation, Espoo (FI)

( * ) Notice: Subject to any disclaimer, the term of this patent is extended or adjusted under 35 U.S.C. 154(b) by 329 days.

(21) Appl. No.: 11/322,915

(22) Filed: Dec. 30, 2005

(65) Prior Publication Data

US 2007/0156908 A1    Jul. 5, 2007

(51) Int. Cl.
*H04M 1/56* (2006.01)
(52) U.S. Cl. .................... 379/202.01; 379/158
(58) Field of Classification Search ........... 379/202.01, 379/157, 158, 159, 207.01
See application file for complete search history.

(56) References Cited

U.S. PATENT DOCUMENTS

| | | | | |
|---|---|---|---|---|
| 5,450,481 | A | * | 9/1995 | Penzias .................. 379/202.01 |
| 5,483,588 | A | | 1/1996 | Eaton et al. |
| 5,991,277 | A | * | 11/1999 | Maeng et al. ................ 370/263 |
| 6,327,343 | B1 | | 12/2001 | Epstein et al. |
| 6,330,321 | B2 | | 12/2001 | Detampel, Jr. et al. |
| 6,377,995 | B2 | | 4/2002 | Agraharam et al. |
| 6,457,043 | B1 | | 9/2002 | Kwak et al. |
| 6,501,739 | B1 | | 12/2002 | Cohen |
| 6,608,636 | B1 | | 8/2003 | Roseman |
| 6,628,767 | B1 | * | 9/2003 | Wellner et al. .......... 379/202.01 |
| 6,744,927 | B1 | | 6/2004 | Kato |
| 6,882,971 | B2 | * | 4/2005 | Craner ......................... 704/246 |
| 7,012,630 | B2 | * | 3/2006 | Curry et al. ............... 348/14.08 |
| 7,266,189 | B1 | * | 9/2007 | Day ....................... 379/202.01 |
| 2003/0081749 | A1 | | 5/2003 | Berstis |
| 2003/0081750 | A1 | | 5/2003 | Berstis |
| 2003/0081751 | A1 | | 5/2003 | Berstis |
| 2003/0125954 | A1 | | 7/2003 | Bradley et al. |
| 2003/0231746 | A1 | | 12/2003 | Hunter et al. |
| 2004/0076277 | A1 | | 4/2004 | Kuusinen et al. |
| 2005/0076081 | A1 | | 4/2005 | Rui et al. |

FOREIGN PATENT DOCUMENTS

WO    WO/02/087204 A1    10/2002

* cited by examiner

*Primary Examiner*—Olisa Anwah
(74) *Attorney, Agent, or Firm*—Alston & Bird LLP

(57) ABSTRACT

A network entity, method and computer program product are provided for effectuating a conference session. The method includes receiving a plurality of audio measurements representative of audio levels adjacent respective participants of the conference session. At least one of the audio measurements can be received from a proximity network including a plurality of participants at one of the remote locations, the audio measurement having been identified as the highest audio measurement of the respective proximity network. After receiving the audio measurement, the audio measurements can be compared to identify the highest session measurement such that the participant associated with the highest session measurement is identified as a speaking participant, the identity being transferred to at least some of the participants of the conference session. A network entity, method and computer program product are also provided for presenting the identity of the speaking participant.

24 Claims, 7 Drawing Sheets

NETWORK ENTITY, METHOD AND COMPUTER PROGRAM PRODUCT FOR EFFECTUATING A CONFERENCE SESSION

FIELD OF THE INVENTION

The present invention generally relates to systems and methods of effectuating a conference session and, more particularly, relates to systems and methods for identifying a speaking participant during effectuation of a conference session.

BACKGROUND OF THE INVENTION

A conference call is a telephone call in which at least three parties participate. Typically, conference calls can be arranged in either a distributed or a centralized manner. To establish a conference call between three parties in a distributed arrangement, for example, an originating party initiates a first call to a first terminating party. After the first call between the originating party and the first terminating party has been established, one of the parties holds the other on the line, and initiates a second call to a second terminating party. After the second call between the respective party and the second terminating party has been established, the respective party can form a conference call by bridging (connecting) the first and second calls together, thereby joining the originating party, first terminating party and second terminating party to a single conference call.

In lieu of a distributed arrangement, a conference call can be established in a centralized arrangement using a conference call service provided by an operator. In such an arrangement, for example, an originating party can initiate a conference call service request to the operator, identifying one or more parameters of the requested conference call, such as the starting time, estimated length of the conference call and other information relating the call. In response thereto, the operator assigns the calling number of a conferencing server to the requested conference call, the calling number thereafter being distributed to the conference call participants (e.g., originating party, first terminating party, second terminating party, etc.). The conference call can then be formed when the participants individually establish calls to the conferencing server via the calling number, and the conferencing server bridging (connecting) those call together to thereby joining the participants into a single conference call.

As will be appreciated, irrespective of whether a conference call is established in a distributed arrangement or a centralized arrangement, it is sometimes difficult for the participants of a conference call to immediately recognize the currently speaking participant. This is in particular a problem in the case in which there are many participating users in a conference call and the participating users do not know each other very well. And whereas various techniques have been developed for identifying the currently speaking participant during a conference call, it is generally desirable to improve upon existing techniques.

SUMMARY OF THE INVENTION

In light of the foregoing background, exemplary embodiments of the present invention provide an improved network entity, method and computer program product for effectuating a conference session between a plurality of participants. In this regard, exemplary embodiments of the present invention provide a conference session architecture that includes a means for identifying the currently speaking participant, particularly in instances where some of the participants are located at the same location. Additionally or alternatively, the conference session architecture of exemplary embodiments of the present invention includes a means for presenting the speaking participant to the other participants, such as in a visual and/or audio manner.

More particularly, in accordance with exemplary embodiments of the present invention, a conference session can be established between a plurality of participants at a plurality of locations in a distributed or centralized arrangement. For at least one of the locations including a plurality of participants, those participants can form a proximity network. During the conference session, then, the participants can obtain audio measurements representative of an audio level adjacent the respective participants. The audio measurements can then be compared with one another to identify the highest measurement, that measurement being associated with the speaking participant. In this regard, for the participants in the proximity network, audio measurements from the participants within the proximity network can be compared with one another to identify the highest measurement. The highest measurement within the proximity network associated can then be compared to measurements obtained by other participants and/or the highest measurements of other proximity networks to identify the highest overall measurement associated with the speaking participant. Thereafter the identity of the speaking participant can be presented to the other participants.

Although the identity of the speaking participant can be presented in a number of different manners, the conference session architecture of exemplary embodiments of the present invention provides a "virtual board room" whereby representations of a plurality of the participants can be presented on a display based upon a state of the respective participants in the conference session. When one of the participants is identified as the speaking participant, then, the representation of the respective participant can be presented based upon the speaking state of the respective participant, such as by changing the color of the representation. Additionally or alternatively, the "virtual board room" can be configured such that one or more of the participants can be associated with a combination of one or more of a plurality of audio channels for providing audio to a plurality of speakers. Thus, audio exchanged between the participants to effectuate the conference session can be additionally or alternatively output via the speakers in accordance with the associated channel combination.

According to one aspect of the present invention, a method is provided for effectuating a conference session between a plurality of participants at a plurality of remote locations. The method includes receiving a plurality of audio measurements representative of audio levels adjacent respective participants of the conference session. At least one of the audio measurements can be received from a proximity network including a plurality of participants at one of the remote locations. In this regard, the audio measurement from the proximity network can have been identified as the highest audio measurement of the proximity network from a comparison of the audio measurements of the participants in the proximity network. More particularly, for example, at least one of the audio measurements can be received from a proximity network including a plurality of participants where at least one of the participants of the proximity network operates as a master, and at least one of the participants operates as a slave. In such an instance, the audio measurement from the proximity network can have been identified as a highest audio measurement by obtaining an audio measurement representative of an audio level adjacent the master, and receiving audio measurements representative of audio levels adjacent the slaves. The audio measurements of the master and slaves can then be compared to thereby identify the highest audio measurement of the proximity network.

After receiving the audio measurement, including audio measurements from the proximity network, the audio measurements can be compared to identify the highest session measurement such that the participant associated with the highest session measurement is identified as a speaking participant. Thereafter, the identity of the speaking participant can be transferred to at least some of the participants of the conference session, such as in a manner so that the participants can thereafter present the speaking participant identity. In this regard, at least some of the participants can include a display capable of presenting representations of at least some of the participants spatially organized on the display. In such an instance, the identity of the speaking participant can be transferred such that the participants receiving the identity and including the display are capable of presenting the identity by presenting the representation of the respective participant based upon a speaking state of the respective participant.

More particularly, the participants can be capable of exchanging voice communication during the conference session, where at least some of the participants are associated with at least one audio channel for providing the exchanged voice communication to at least one speaker. For those participants associated with audio channel(s) and also including a display, for example, at least some of the participants can be associated with audio channel(s) by associating area(s) of the display with audio channel(s) to thereby associate the participants with representations in the areas of the display with the respective audio channel(s). Irrespective of how the participants are associated with audio channels, however, the identity of the speaking participant can therefore be transferred such that the participants receiving the identity can be capable of presenting the identity by outputting the exchanged voice communication on the audio channel(s) associated with the speaking participant to thereby provide the exchanged voice communication to the respective speaker(s). In this regard, the identity of the speaking participant can be presented in an audio manner in addition to or in lieu of presenting the representation of the respective participant in a visual manner based upon a speaking state of the respective participant.

According to other aspects of the present invention, a network entity and a computer program product are provided for effectuating a conference session. Embodiments of the present invention therefore provide an improved network entity, method and computer program product for effectuating a conference session. The network entity, method and computer program product of exemplary embodiments of the present invention are capable of identifying the speaking participant of a conference session based upon audio measurements obtained by the participants. For participants at one or more locations, a proximity network may be established such that the audio measurements by those participants are compared to obtain a highest proximity network measurement for comparison with the measurements of other participants. By establishing such a proximity network, exemplary embodiments of the present invention are capable of identifying the speaking participant particularly when a number of participants are located at the same location.

Exemplary embodiments of the present invention may also be capable of presenting the identity of the speaking participant in a visual and/or audio manner. In this regard, the participants may be associated with representations presented on a display, and/or with one or more audio channel(s) for providing voice communication to one or more speakers. The representations can then be presented based upon a state of the respective participants, such as a speaking state of the speaking participant. Additionally or alternatively, voice communication can be output on channel(s) associated with the speaking participant, thereby providing voice communication to speaker(s) configured to receive voice communication on the respective channel(s). As such, the network entity, method and computer program product of exemplary embodiments of the present invention may solve the problems identified by prior techniques and may provide additional advantages.

BRIEF DESCRIPTION OF THE DRAWINGS

Figure 1:
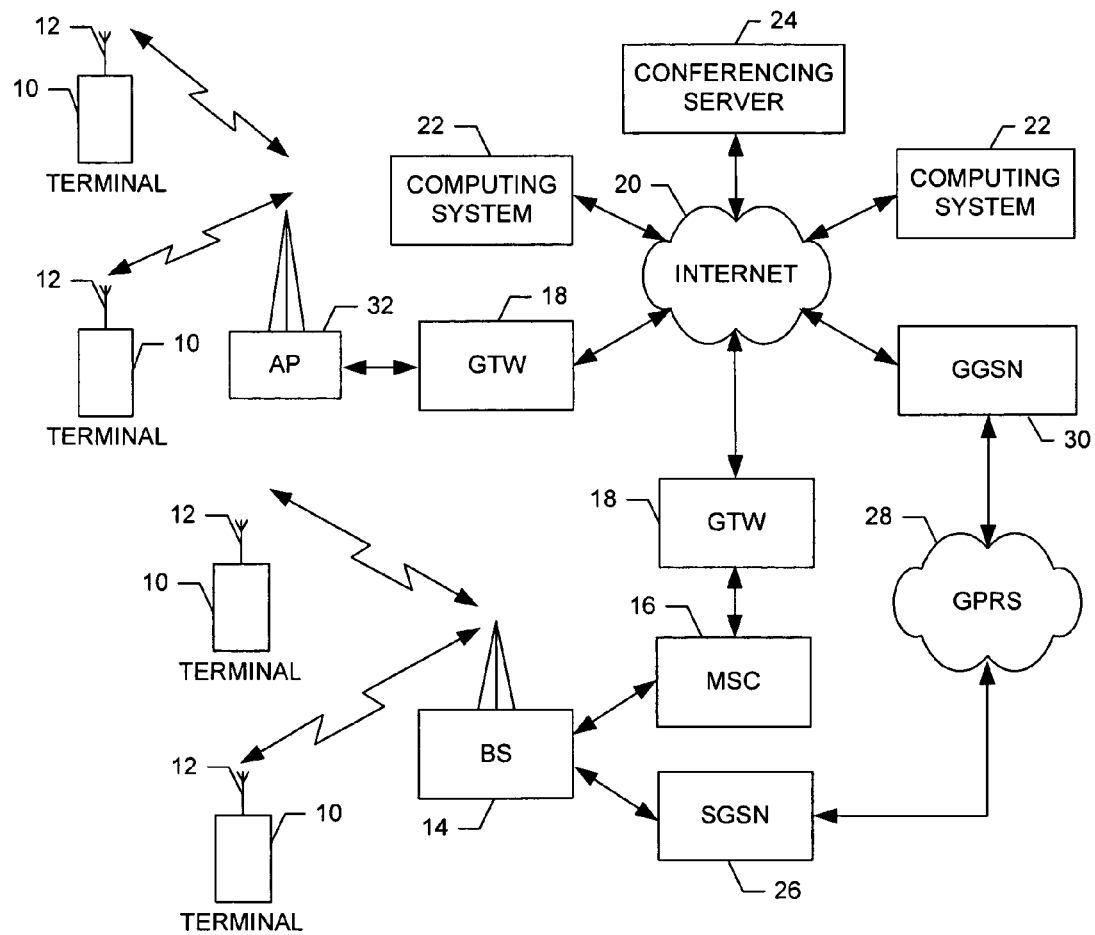
Figure 2:
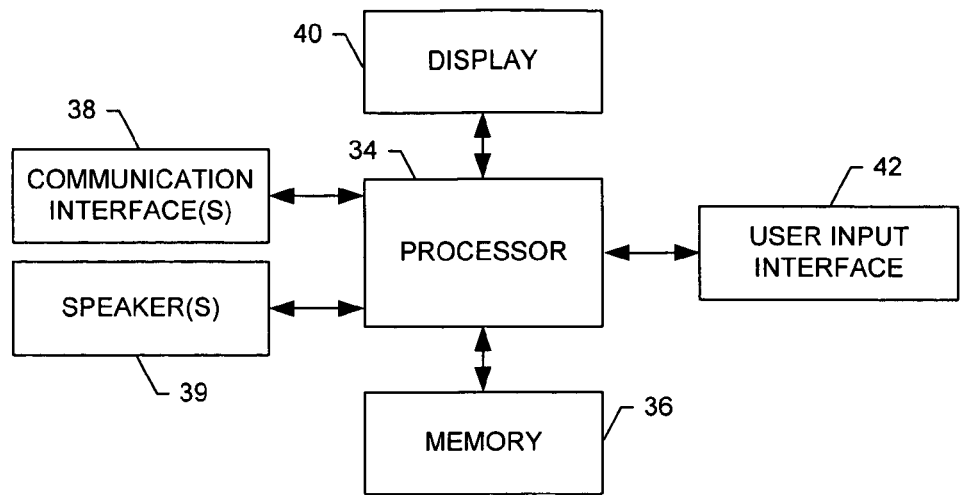
Figure 3:
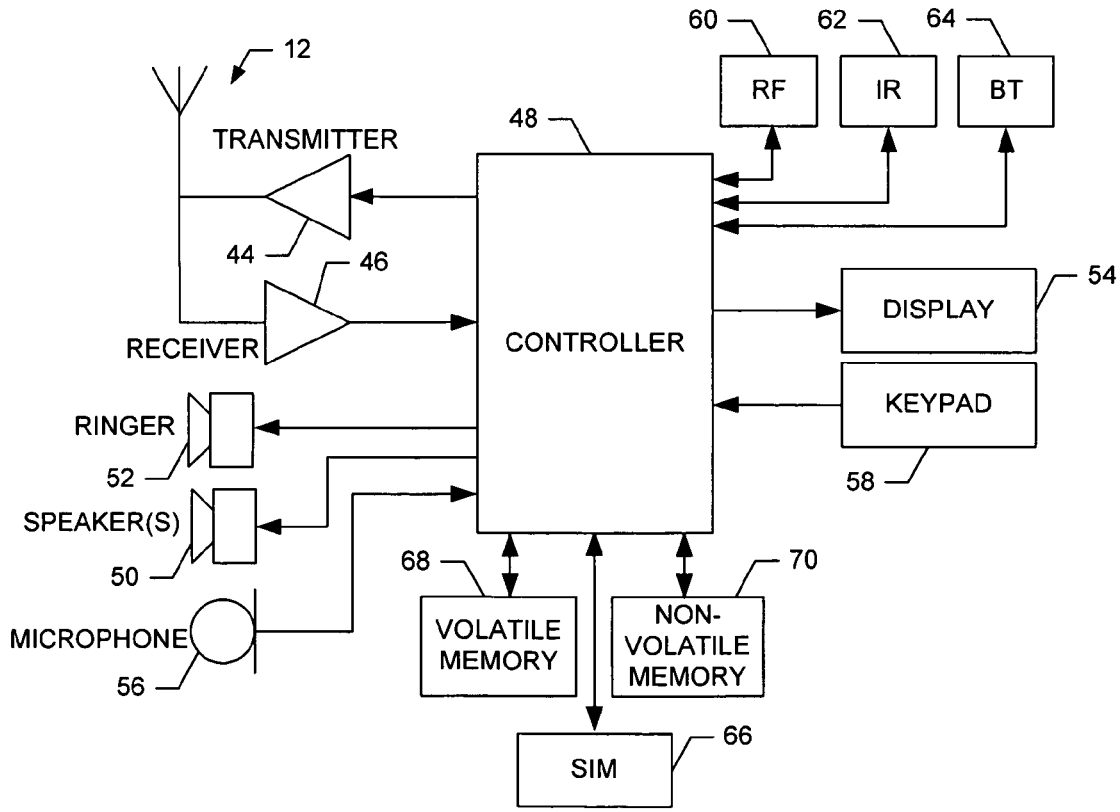
Figure 4:
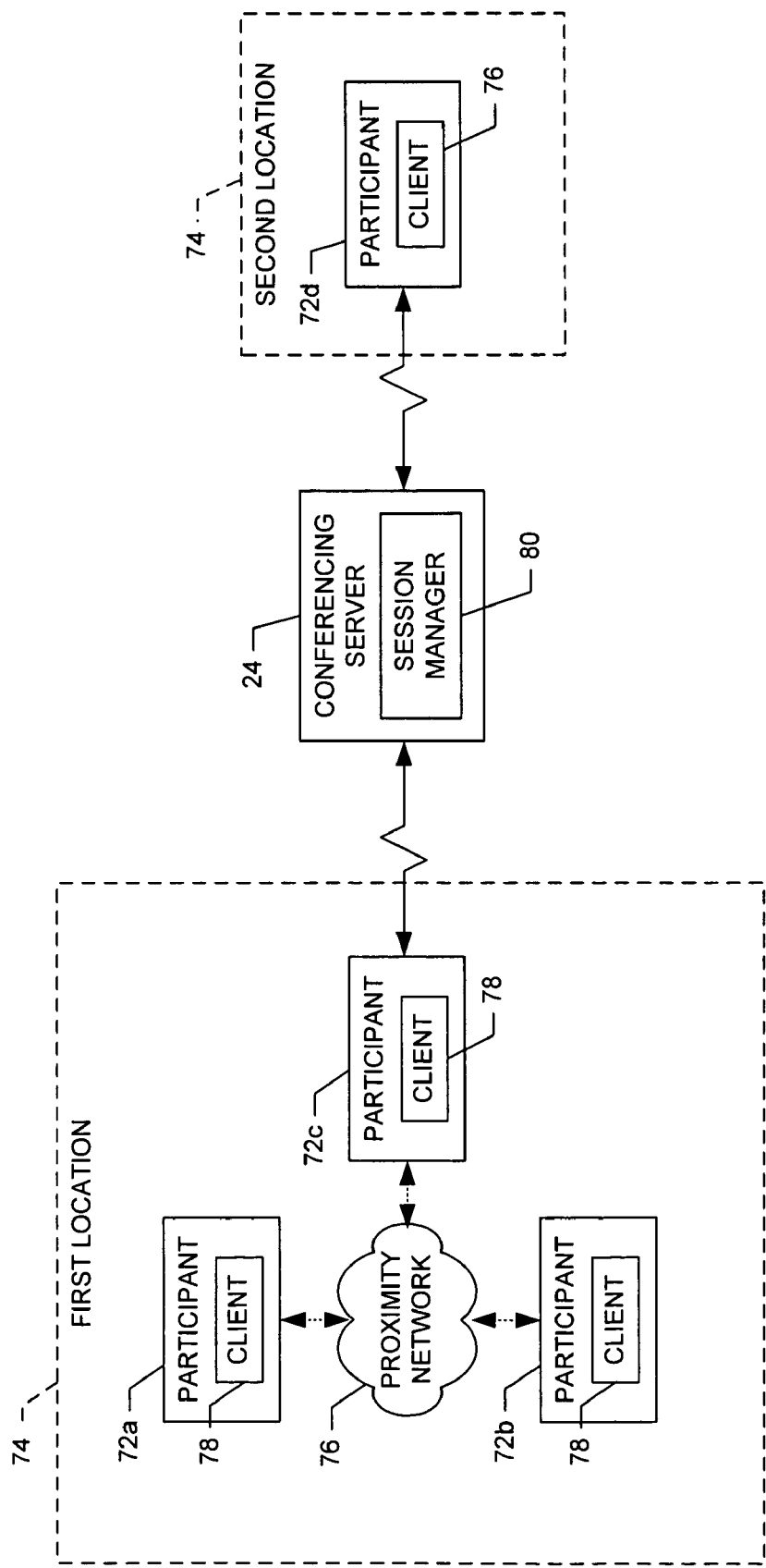
Figure 5:
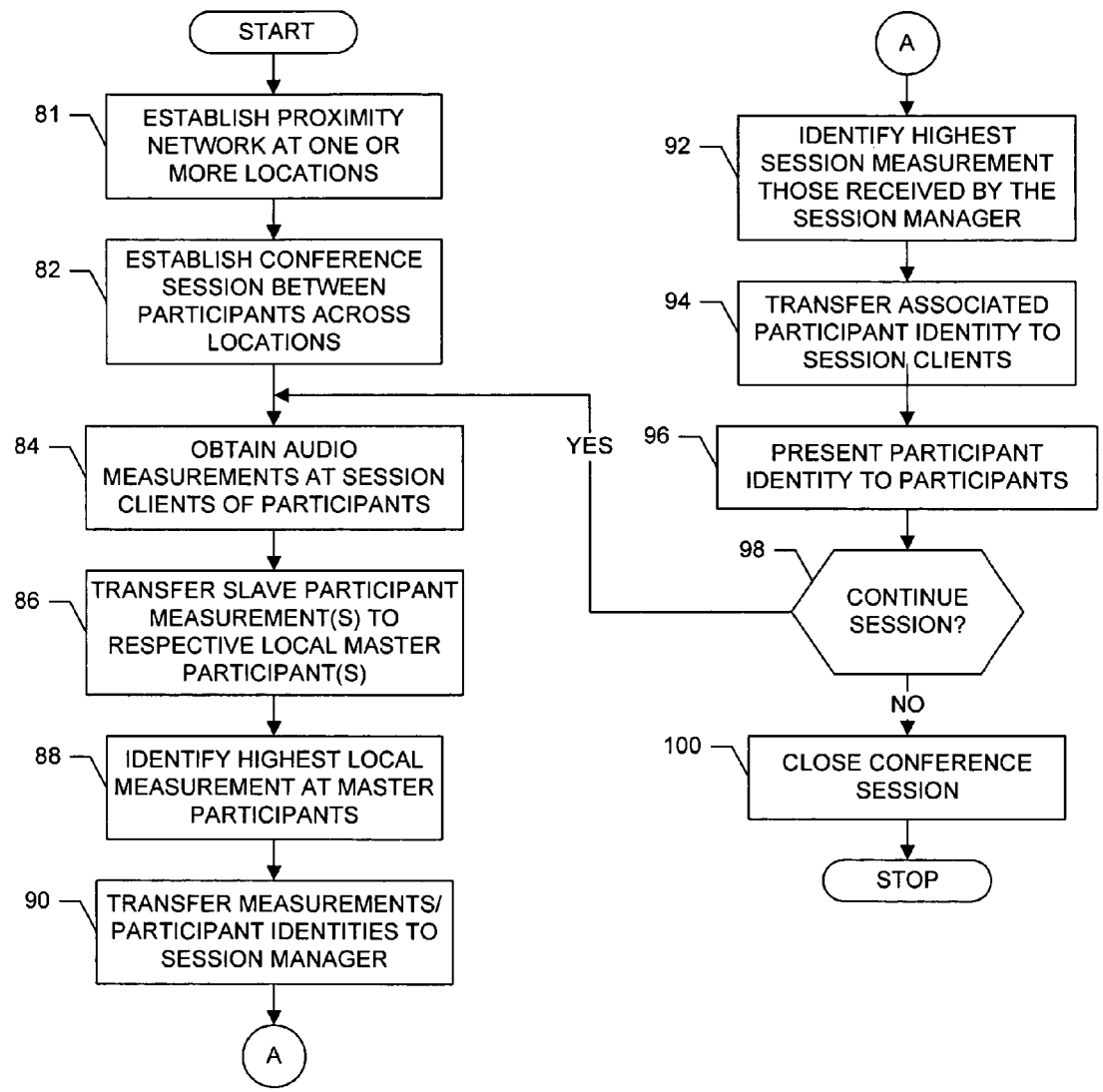
Figure 6:
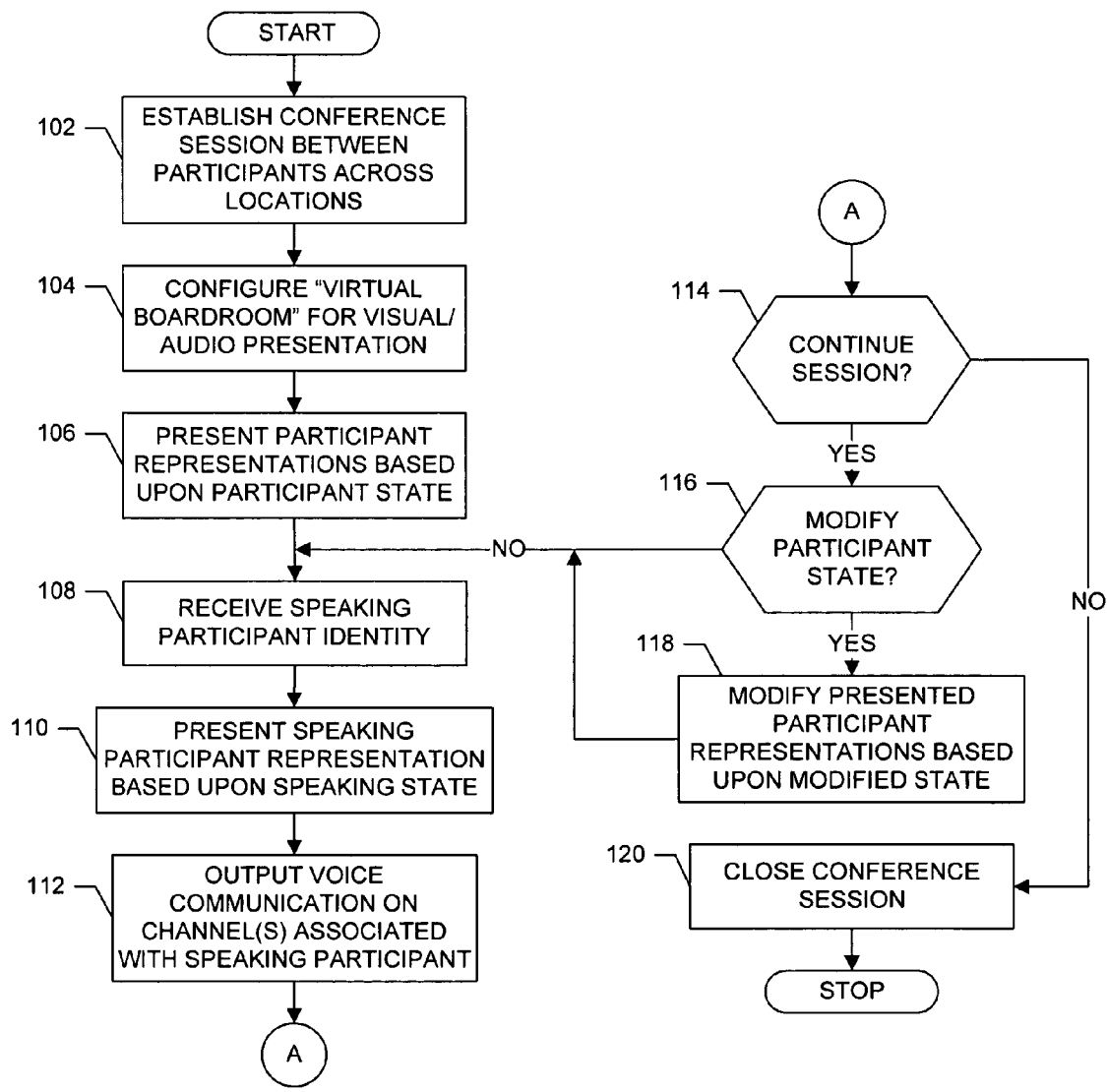
Figure 7:
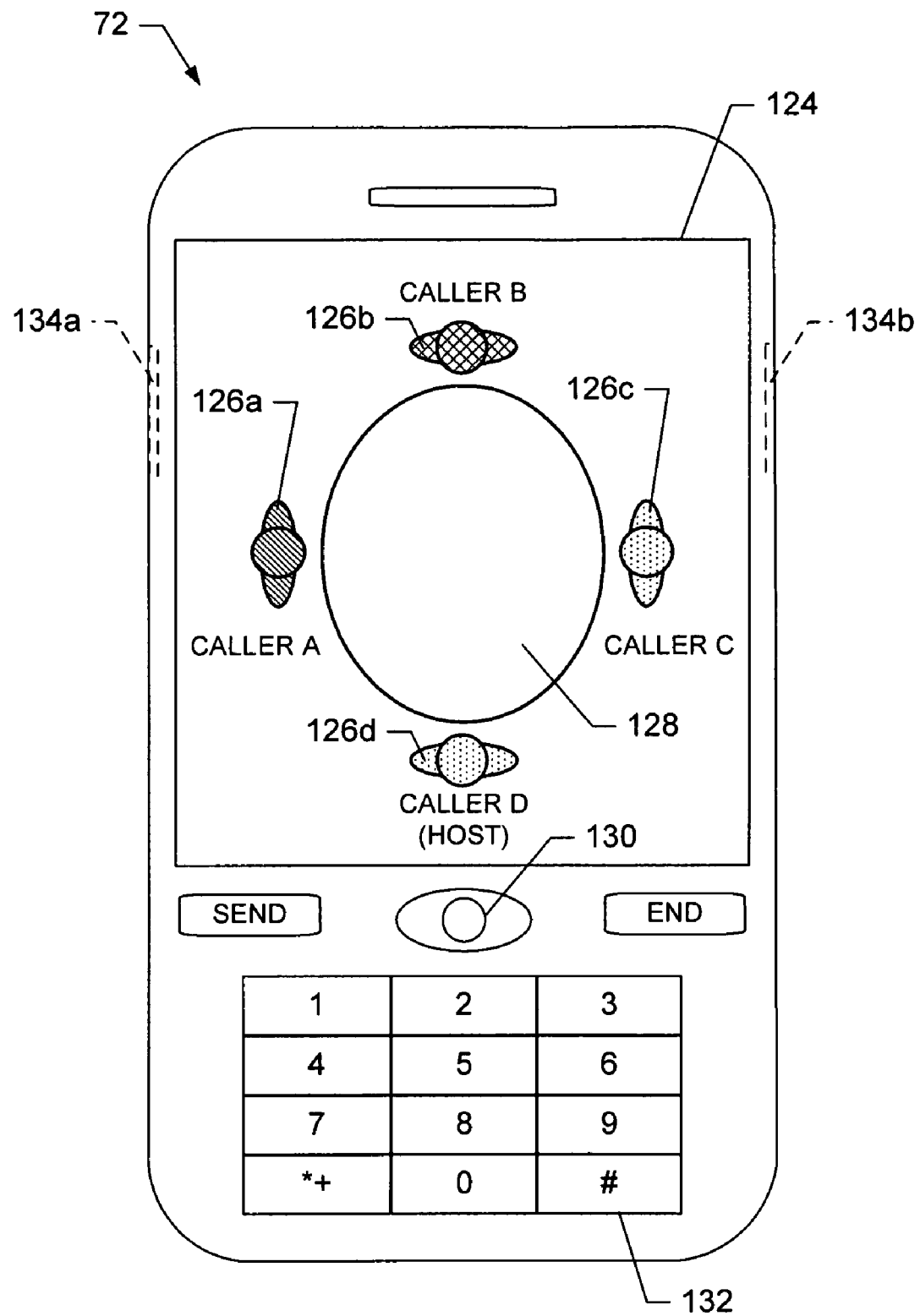

Having thus described the invention in general terms, reference will now be made to the accompanying drawings, which are not necessarily drawn to scale, and wherein:

FIG. 1 is a block diagram of one type of terminal and system that would benefit from embodiments of the present invention;

FIG. 2 is a schematic block diagram of an entity capable of operating as a terminal, computing system and/or conferencing server, in accordance with exemplary embodiments of the present invention;

FIG. 3 is a schematic block diagram of a terminal comprising a mobile station, in accordance with one exemplary embodiment of the present invention;

FIG. 4 is a functional block diagram of a plurality of participants effectuating a conference session via a conferencing server, in accordance with one exemplary embodiment of the present invention;

FIGS. 5 and 6 are flowcharts illustrating various steps in a method of establishing and effectuating a conference session, in accordance with exemplary embodiments of the present invention;

FIG. 7 is a schematic block diagram of a "virtual boardroom" provided by a participant device, in accordance with exemplary embodiments of the present invention; and FIGS. 8a-8d are schematic block diagrams of the "virtual boardroom" of FIG. 7 and audio output from the participant device during operation, in accordance with exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, one or more terminals 10 may each include an antenna 12 for transmitting signals to and for receiving signals from a base site or base station (BS) 14. The base station is a part of one or more cellular or mobile networks each of which includes elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, as explained below, the processing elements can include one or more processing elements associated with a computing system 22 (two shown in FIG. 1), conferencing server 24 (one shown in FIG. 1) or the like, as described below.

The BS 14 can also be coupled to a signaling GPRS (General Packet Radio Service) support node (SGSN) 26. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 28. The packet-switched core network is then coupled to another GTW, such as a GTW GPRS support node (GGSN) 30, and the GGSN is coupled to the Internet. In addition to the GGSN, the packet-switched core network can also be coupled to a GTW 18. Also, the GGSN can be coupled to a messaging center. In this regard, the GGSN and the SGSN, like the MSC, can be capable of controlling the forwarding of messages, such as MMS messages. The GGSN and SGSN can also be capable of controlling the forwarding of messages for the terminal to and from the messaging center.

In addition, by coupling the SGSN 26 to the GPRS core network 28 and the GGSN 30, devices such as a computing system 22 and/or conferencing server 24 can be coupled to the terminal 10 via the Internet 20, SGSN and GGSN. In this regard, devices such as a computing system and/or conferencing server can communicate with the terminal across the SGSN, GPRS and GGSN. By directly or indirectly connecting the terminals and the other devices (e.g., computing system, conferencing server, etc.) to the Internet, the terminals can communicate with the other devices and with one another, such as according to the Hypertext Transfer Protocol (HTTP), to thereby carry out various functions of the terminal.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The terminal 10 can further be coupled to one or more wireless access points (APs) 32. The APs can comprise access points configured to communicate with the terminal in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs may be coupled to the Internet 20. Like with the MSC 16, the APs can be directly coupled to the Internet. In one embodiment, however, the APs are indirectly coupled to the Internet via a GTW 18. As will be appreciated, by directly or indirectly connecting the terminals and the computing system 22, conferencing server 24, and/or any of a number of other devices, to the Internet, the terminals can communicate with one another, the computing system, etc., to thereby carry out various functions of the terminal, such as to transmit data, content or the like to, and/or receive content, data or the like from, the computing system. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the terminal 10 to computing systems 22 across the Internet 20, the terminal and computing system can be coupled to one another and communicate in accordance with, for example, RF, BT, IrDA or any of a number of different wireline or wireless communication techniques, including LAN, WLAN, WiMAX and/or UWB techniques. One or more of the computing systems can additionally, or alternatively, include a removable memory capable of storing content, which can thereafter be transferred to the terminal. Further, the terminal 10 can be coupled to one or more electronic devices, such as printers, digital projectors and/or other multimedia capturing, producing and/or storing devices (e.g., other terminals). Like with the computing systems 22, the terminal can be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Referring now to FIG. 2, a block diagram of an entity capable of operating as a terminal 10, computing system 22 and/or conferencing server 24, is shown in accordance with one embodiment of the present invention. Although shown as separate entities, in some embodiments, one or more entities may support one or more of a terminal, conferencing server and/or computing system, logically separated but co-located within the entit(ies). For example, a single entity may support a logically separate, but co-located, computing system and conferencing server. Also, for example, a single entity may support a logically separate, but co-located terminal and computing system. Further, for example, a single entity may support a logically separate, but co-located terminal and conferencing server.

The entity capable of operating as a terminal 10, computing system 22 and/or conferencing server 24 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include a processor 34 connected to a memory 36. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with embodiments of the present invention. As explained below, for example, the memory can store client application(s).

As described herein, the client application(s) may each comprise software operated by the respective entities. It should be understood, however, that any one or more of the client applications described herein can alternatively comprise firmware or hardware, without departing from the spirit and scope of the present invention. Generally, then, the terminal 10, computing system 22 and/or conferencing server 24 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (i.e., terminal, computing system, conferencing server, etc.) or more particularly, for example, a processor 34 of the respective network entity. The design of integrated circuits is by and large a highly automated process. In this regard, complex and powerful software tools are available for converting a logic level design into a semiconductor circuit design ready to be etched and formed on a semiconductor substrate. These software tools, such as those provided by Avant! Corporation of Fremont, Calif. and Cadence Design, of San Jose, Calif., automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 36, the processor 34 can also be connected to at least one interface or other means for displaying, transmitting and/or receiving data, content or the like. In this regard, the interface(s) can include at least one communication interface 38 or other means for transmitting and/or receiving data, content or the like. As explained below, for example, the communication interface(s) can include a first communication interface for connecting to a first network, and a second communication interface for connecting to a second network. In addition to the communication interface(s), the interface(s) can also include at least one user interface that can include one or more earphones and/or speakers 39, a display 40, and/or a user input interface 42. The user input interface, in turn, can comprise any of a number of devices allowing the entity to receive data from a user, such as a microphone, a keypad, a touch display, a joystick or other input device.

Reference is now made to FIG. 3, which illustrates one type of terminal 10 that would benefit from embodiments of the present invention. It should be understood, however, that the terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

The terminal 10 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 3, in addition to an antenna 12, the terminal 10 includes a transmitter 44, a receiver 46, and a controller 48 that provides signals to and receives signals from the transmitter and receiver, respectively. These signals include signaling information in accordance with the air interface standard of the applicable cellular system, and also user speech and/or user generated data. In this regard, the terminal can be capable of operating with one or more air interface standards, communication protocols, modulation types, and access types. More particularly, the terminal can be capable of operating in accordance with any of a number of first generation (1G), second generation (2G), 2.5G and/or third-generation (3G) communication protocols or the like. For example, the terminal may be capable of operating in accordance with 2G wireless communication protocols IS-136 (TDMA), GSM, and IS-95 (CDMA). Also, for example, the terminal may be capable of operating in accordance with 2.5G wireless communication protocols GPRS, Enhanced Data GSM Environment (EDGE), or the like. Further, for example, the terminal may be capable of operating in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 48 includes the circuitry required for implementing the audio and logic functions of the terminal 10. For example, the controller may be comprised of a digital signal processor device, a microprocessor device, and various analog-to-digital converters, digital-toanalog converters, and other support circuits. The control and signal processing functions of the terminal are allocated between these devices according to their respective capabilities. The controller can additionally include an internal voice coder (VC), and may include an internal data modem (DM). Further, the controller may include the functionality to operate one or more software programs, which may be stored in memory (described below). For example, the controller may be capable of operating a connectivity program, such as a conventional Web browser. The connectivity program may then allow the terminal to transmit and receive Web content, such as according to HTTP and/or the Wireless Application Protocol (WAP), for example.

The terminal 10 also comprises a user interface including one or more earphones and/or speakers 50, a ringer 52, a display 54, and a user input interface, all of which are coupled to the controller 48. The user input interface, which allows the terminal to receive data, can comprise any of a number of devices allowing the terminal to receive data, such as a microphone 56, a keypad 58, a touch display and/or other input device. In embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

The terminal 10 can also include one or more means for sharing and/or obtaining data. For example, the terminal can include a short-range radio frequency (RF) transceiver or interrogator 60 so that data can be shared with and/or obtained from electronic devices in accordance with RF techniques. The terminal can additionally, or alternatively, include other short-range transceivers, such as, for example an infrared (IR) transceiver 62, and/or a Bluetooth (BT) transceiver 64 operating using Bluetooth brand wireless technology developed by the Bluetooth Special Interest Group. The terminal can therefore additionally or alternatively be capable of transmitting data to and/or receiving data from electronic devices in accordance with such techniques. Although not shown, the terminal can additionally or alternatively be capable of transmitting and/or receiving data from electronic devices according to a number of different wireless networking techniques, including WLAN, WiMAX, UWB techniques or the like.

The terminal 10 can further include memory, such as a subscriber identity module (SIM) 66, a removable user identity module (R-UIM) or the like, which typically stores information elements related to a mobile subscriber. In addition to the SIM, the terminal can include other removable and/or fixed memory. In this regard, the terminal can include volatile memory 68, such as volatile Random Access Memory (RAM) including a cache area for the temporary storage of data. The terminal can also include other non-volatile memory 70, which can be embedded and/or may be removable. The non-volatile memory can additionally or alternatively comprise an EEPROM, flash memory or the like. The memories can store any of a number of pieces of information, and data, used by the terminal to implement the functions of the terminal. For example, the memories can store an identifier, such as an international mobile equipment identification (IMEI) code, international mobile subscriber identification (IMSI) code, mobile station integrated services digital network (MSISDN) code (mobile telephone number), Session Initiation Protocol (SIP) address or the like, capable of uniquely identifying the mobile station, such as to the MSC 16. In addition, the memories can store one or more client applications capable of operating on the terminal.

As explained in the background section, in various instances during a conference session, it is sometimes difficult for the conference session participants to immediately recognize the currently speaking participant. This is in particular a problem, in case there are many participating users in a conference session, while these participating users do not know each other very well. And whereas various techniques have been developed for identifying the currently speaking participant during a conference session, it is generally desirable to improve upon existing techniques. Thus, exemplary embodiments of the present invention provide a conference session architecture that includes a means for identifying the currently speaking participant, particularly in instances where some of the participants are located at the same location. Additionally or alternatively, the conference session architecture of exemplary embodiments of the present invention includes a means for presenting the speaking participant to the other participants, such as in a visual and/or audio manner.

More particularly, in accordance with exemplary embodiments of the present invention, a conference session can be established between a plurality of participants via a plurality of devices (e.g., terminal 10, computing system 22, etc.) in a distributed or centralized arrangement via a conferencing server 24. The participants can be located at a plurality of remote locations that each includes at least one participant. For at least one of the locations including a plurality of participants, those participants can form a proximity network. During the conference session, then, the participants' devices can obtain audio measurements representative of an audio level adjacent the devices, the measurements being obtained such that the audio level is typically higher when the respective participants are speaking. The audio measurements can then be compared with one another to identify the highest measurement, that measurement being associated with the speaking participant. In this regard, for the participants in the proximity network, audio measurements from the participants within the proximity network can be compared with one another to identify the highest measurement. The highest measurement within the proximity network can then be compared to measurements obtained by other participants and/or the highest measurements of other proximity networks to identify the highest overall measurement associated with the speaking participant. Thereafter the identity of the speaking participant can be presented to the other participants.

Although the identity of the speaking participant can be presented in a number of different manners, the conference session architecture of exemplary embodiments of the present invention provides a "virtual board room" whereby representations of a plurality of the participants can be presented on a display (e.g., display 40, display 54, etc.). When one of the participants is identified as the speaking participant, then, the representation of the respective participant can be presented based upon the speaking state of the respective participant, such as by changing the color of the representation. Additionally or alternatively, the "virtual board room" can be configured such that one or more of the participants can be associated with a combination of one or more of a plurality of audio channels for providing audio to a plurality of speakers (e.g., speakers 39, speakers 50, etc.). Thus, in addition to or in lieu of altering the representation of the speaking participant, audio exchanged between the participants to effectuate the conference session can be output via the speakers in accordance with the associated channel combination.

Reference is now drawn to FIG. 4, which illustrates a functional block diagram of a plurality of conference participants 72 establishing and thereafter effectuating a conference session. As indicated above, at least some of the participants may be associated with respective devices (e.g., terminal 10, computing system 22, etc.) for carrying out communication during the conference session. Thus, as explained below, the term "participant" can refer to a participant and/or the participant's associated device. As shown, the conference session is configured in a centralized arrangement via a conferencing server 24. It should be understood, however, that the conference session may alternatively be established and effectuated in a distributed arrangement without a conferencing server, if so desired. Irrespective of the particular arrangement of the conference session, the participants are located at a plurality of remote locations 74 that each includes at least one participant.

At one or more of the remote locations 74, at least some of the participants 72 of the respective location may establish a proximity network 76 for the exchange of data and, if so desired, voice communication (the term "voice communication" being used herein to refer to voice and/or other audio communication). In such instances, the proximity network can be established in accordance with any of a number of different communication techniques such as RF, BT, IrDA, and/or any of a number of different wireless and/or wireline networking techniques such as LAN, WLAN, WiMAX and/or UWB techniques. Within a proximity network, then, one of the participants can operate as a master while the one or more other participants operate as slaves for the exchange of at least data communication. In this regard, as explained below, the master of a proximity network can be capable of controlling the exchange or other transfer of voice and/or data communication between the participants in the respective proximity network and the participants outside the respective proximity network. As shown in FIG. 4, for example, the first location includes participants 72a-72c, where participants 72a and 72b are capable of operating as slaves, and participants 72c is capable of operating as a master.

During the conference session, the participants 72 of the conference session, including those within respective proximity network(s) 76, can exchange voice communication in a number of different manners. For example, at least some, if not all, of the participants of a proximity network can exchange voice communication with the other participants independent of the respective proximity network but via one of the participants (e.g., the master) or via another entity in communication with the participants, as such may be the case when the device of one of the participants or another device within the proximity network is capable of functioning as a speakerphone. Also, for example, at least some, if not all, of the participants of a proximity network can exchange voice communication with other participants via the proximity network and one of the participants (e.g., the master) or another entity within the proximity network and in communication with the participants, such as in the same manner as the participants exchange data communication. In another example, at least some of the participants within a proximity network can exchange voice communication with the other participants independent of the proximity network and any of the participants (e.g., the master) or another entity in communication with the participants. It should be understood, then, that although the participants may be shown and described with respect to the exchange of data during a conference session, those participants typically also exchange voice communication in any of a number of different manners.

To enable identification of a speaking participant during the conference session, each of the participants 72 is capable of operating a session client 78 that is capable of obtaining audio measurements representative of an audio level in proximity to the respective participant. The measurements can then be directly or indirectly provided to a session manager 80, which is operable by the conferencing server 24 (as shown), one of the participants or another network entity coupled to or otherwise in communication with the conferencing server or one of the participants. The session manager is then capable of identifying a speaking participant based upon the measurements, and notifying the session clients of the identity of the speaking participant such that the session clients can present the identity of the speaking participant to the other participants (as well as the speaking participant, if so desired).

As shown and described herein, the session clients 78 and session manager 80 each comprise software operated by a respective network entity (e.g., participant 72, conferencing server 24, etc.). It should be understood, however, that one or more session clients and/or the session manager can alternatively comprise firmware or hardware, without departing from the spirit and scope of the present invention. Also, although the session clients and session manager are shown and described as being local to respective network entities, respectively, any one or more of the session clients and/or session manager can alternatively be distributed from, and in communication with, a respective network entity, such as across the Internet 20. Further, as shown and described herein, voice and/or data communication is provided, exchanged or otherwise transferred from one or more participants to one or more other participants. It should be understood, however, that the terms "providing," "exchanging" and "transferring" can be used herein interchangeably, and that providing, exchanging or transferring voice and/or data communication can include, for example, moving or copying voice and/or data communication, without departing from the spirit and scope of the present invention.

Reference is now drawn to FIG. 5, which illustrates a flowchart including various steps in a method of establishing and effectuating a conference session between a number of participants 72 at a plurality of remote locations 74. For purposes of illustration and without loss of generality, the participants of the conference session include a plurality of participants 72a-72d located at two locations as shown in FIG. 4, where participants 72a-72c are located at the first location, and participant 72d is located at the second location. Now, as shown in block 81, a method according to one exemplary embodiment of the present invention includes the participants at one or more remote locations establishing proximity networks 76 at those respective locations. For example, participants 72a-72c at the first location can establish a Bluetooth network at the first location, where participant 72c can function as the master of the proximity network, and participants 72a and 72b operate as slaves.

Before, after or as the proximity network(s) are established at the respective remote locations 74, the participants 72 at the remote locations can establish a conference session therebetween, as shown in block 82. The conference session can be established in any of a number of different manners, including in a distributed arrangement or in a centralized arrangement via a conferencing server 24, as shown in FIG. 4. During establishment of the conference session, the conferencing server can be notified of the identities of the participants of the conference session, and/or the participants can be notified of the identities of the other participants. As will be appreciated, each identity can comprise any of a number of different means capable of identifying the respective participant to the other participants, such as the name, nickname, username, telephone number, network address or the like of the respective participant or remote location of the respective participant.

Consider instances in which a participant 72 is identified to the conferencing server 24 and/or other participants by means of a first, typically less familiar, identity such as a telephone number, network address or the like. In such instances, the conferencing server and/or other participants can, if so desired, be configured to determine a second, typically more familiar, identity based upon the first identity. For example, the conferencing server and/or other participants can be configured to determine a name, nickname, username or the like, of the identified participant based upon the respective participant's first identity. As will be appreciated, the conferencing server and/or other participants can determine the second identity in any of a number of different manners, such as by matching the first identity to a second identity in a database (e.g., phone book, etc.) that includes a number of pairs of first identities and associated second identities.

Irrespective of exactly how the conference session is established between the participants 72, and irrespective of how the participants are identified to the conferencing server and/or one another, the conference session can thereafter be effectuated or otherwise carried out by the participants, with the participants exchanging voice and/or data communication between one another. As the conference session is effectuated, the participants, or more particularly the session clients 78 of the participants, can obtain one or more audio measurements representative of an audio level in proximity to the respective participants, as shown in block 84. As will be appreciated, the audio measurements can be obtained in any of a number of different manners, such as via an appropriate user input interface element (e.g., microphone 56).

As will also be appreciated, at any session client 78, each audio measurement can be representative of an audio level obtained by the session client at a given time instant. Alternatively, however, each audio measurement can be representative of the average of a plurality of audio levels obtained by the session client at a plurality of time instances over a period of time. For example, each audio measurement can be representative of the average of five audio levels obtained by the session client at five one-second time instances over a five second period of time. In such instances, the audio measurement can be updated with a frequency less than or equal to the period of time. Continuing the above example, the audio measurement can be updated every second, with the current audio measurement representative of the average of the audio levels obtained by the session client at most recent five one-second time instances.

Irrespective of how the audio measurements are obtained by the session clients 78, the slave(s) of the proximity network(s) 76 can transfer their audio measurements to the master, or more particularly the session client 78 of the master, within the same proximity network, as shown in block 86. As shown in FIG. 4, for example, slave participants 72a and 72b can transfer their audio measurements to master participant 72c via the proximity network at the first location 74. After the session client(s) of the proximity network master(s) obtains its audio measurement (or average audio measurement) and receives the audio measurement(s) of respective slave(s), the master(s) can compare the audio measurements to identify the highest local measurement of the respective proximity network(s). Thereafter, the highest local measurement(s) of the proximity network(s), the session client(s) of the master(s) (e.g., participant 72c) of the proximity network(s) can transfer those highest local measurement(s), along with the identit(ies) of the participant(s) associated with those measurement(s), to the session manager 80, as shown in block 90. Similarly, the audio measurement(s) and identit(ies) of any participant(s) outside a proximity network can be transferred to the session manager.

Upon receiving the measurements from the proximity network master(s) and participants 72 outside a proximity network 76, the session manager 80 can compare the audio measurements to identify the highest session measurement of the conference session, as shown in block 92. The participant associated with the highest session measurement, then, can be identified as the speaking participant. Upon identifying the highest session measurement, the session manager can transfer the identity of the speaking participant (i.e., the participant associated with the highest session measurement) back to the participants. The session manager can transfer the identity of the speaking participant to the participants in a number of different manners, such as in the same or a different manner than that in which the proximity network master(s) and participants outside a proximity network transferred the audio measurements to the session manager. More particularly with respect to those participants in proximity network(s) 76, for example, the session manager can transfer the identity of the speaking participant to the participants in proximity network(s) via their respective master(s).

Irrespective of how the session manager 80 transfers the identity of the speaking participant to the participants 72, the participants can thereafter present the identity, or more particularly the participants' devices can thereafter present the identity to the respective participants, as shown in block 96 and explained in greater detail below with respect to one exemplary embodiment of the present invention. As shown at block 98, the session can then continue with the session clients 78 of the participants continuing to obtain or otherwise updating audio measurements such that the session manager can continue to identify or otherwise update the speaking participant. At one or more points during the conference session, one or more participants may desire to end the conference session. At such instances, then, those participants can close their connection to the conference session, as shown in block 100. Closing the conference session, then, may close the communication sessions previously established between the participants and the conferencing server 24.

As indicated above, although the identity of the speaking participant can be presented in a number of different manners, the session clients 78 can provide a "virtual boardroom" whereby representations of a plurality of the participants 72 can be presented on a participant display (e.g., display 40, display 54, etc.). Reference is now made to FIG. 6, which illustrates various steps in a method of presenting the identity of the speaking participant of a conference session including a plurality of participants at one or more remote locations. As shown in block 102, the method can include a plurality of participants 72 at one or more remote locations 74 establishing a conference session therebetween, such as in a distributed arrangement or a centralized arrangement via a conferencing server 24. Similar to before, during establishment of the conference session, the conferencing server can be notified of the identities of the participants of the conference session, and/or the participants can be notified of the identities of the other participants.

Before, after or as the conference session is established, one or more of the session clients 78 of the conference participants 72 can be configured to provide a "virtual boardroom" for presenting the participants to one another in a visual and/or audio manner, as shown in block 104. As shown in FIG. 7, for example, the session client can be configured to present a representation of the participants spatially organized on the participant display 124 (e.g., display 40, display 54, etc.), such as around a representation of a board table 128. For a conference session including four participants, for example, the session clients can present representations 126a-126d spatially organized on the display around a representation of a board table. The representations can comprise any one or more visual elements capable of identifying the respective participants, such as by presenting a visual element that may be the same or differ from one participant to the next, where the visual element is accompanied by the identities of the participants (e.g., "caller A," "caller B," "caller C," "caller D," etc.).

Irrespective of the specific type of representation, the session client 78 can be configured by any one or more of the participants 72 to present the representations 126 in a number of different manners. For example, each participant may configure their own session client. Additionally or alternatively, at one or more instances during the conference one of the participants can be designated as a "host" for the conference, where the host participant may configure the session clients of a number of, if not all of, the participants. Irrespective of how the session clients are configured to present the representations, the representations can be configured in any of a number of different manners. For example, a participant/host can spatially organize the representations via the user input interface of the participant device, such as by using a joystick 130 to drag the representations to particular positions on the display. Additionally or alternatively, for example, the participant/host can spatially organize the representations using a keypad 132, where keys of the keypad may be associated with positions on the display.

In addition to spatially organizing the representations 126 on the display 124, the session client 78 can be configured to present the representations based upon a state of the respective participants, such as by presenting the currently speaking participant, the host participant, muted participants, participants joining an established conference, participants that joined and then closed their connection to an established conference, or the like. More particularly, for example, the session client can be configured to present the currently speaking participant in a color (e.g., green) different from a color of muted participants (e.g., red), and the remaining participants in a color (e.g., black) different from the speaking participant and muted participants.

In addition to or in lieu of the "virtual board room" of the session client 78 being configured to present representations 126 of the participants 72, the "virtual board room" can be configured to associate one or more of the participants with one or more audio channels capable of providing voice communication to speakers 134 of the participants, as also shown in block 104. The participants can be associated with audio channel(s) in any of a number of different manners, such as by directly associating the participants with audio channel(s). Alternatively, for example, the participants can be indirectly associated with audio channel(s) by associating areas of the display 124, and thus the participants with representations 126 in those areas, with audio channel(s). Thus, not only can the display present a visual indication of the status of the participants, but the speakers can also present an audio indication of the status of at least one of the participants, such as by outputting voice communication from the currently speaking participant on channel(s) associated with that participant. As explained below, the participants may be described as being associated with audio channel(s) for providing voice communication to speaker(s) of the participant device configured to receive voice communication from the respective channel(s). It should be understood, however, that other audio channel(s), and thus other speaker(s), may output audio in such instances, although the associated audio channel(s) may dominate the output in a manner similar to providing surround sound audio.

For a conference session including four participants 72a-72d similar to that shown in FIG. 7, for example, representations 126a-126d of the participants can be spatially organized such that each representation is presented in an area of the display 124, where each area may correspond to a side of the display. Each area and thus each participant can then be associated with one or more audio channel(s). For example, the first and second sides of the display, and thus the first and second participants 72a and 72b, can be associated with first and second audio channels, respectively, for providing audio to a first speaker 134a and a second speaker 134b, respectively. The third and fourth sides of the display, and thus the third and fourth participants 72c and 72d, can each be associated with third and fourth audio channels for providing audio to third and fourth speakers, respectively. Alternatively, for example, the third and fourth sides of the display can each be associated with one or both the first and second audio channels for providing audio to one or both the first and second speakers. In such an instance, although the representations proximate the third and fourth sides may be associated with the same audio channel(s) as another representation or each other, the session client 78 can be further configured to process the audio output on channel(s) associated with more than one representation, such as by adjusting the volume of the audio output, so as to distinguish the audio associated with the respective participants.

Irrespective of exactly how the "virtual boardroom" of the session client 78 is configured, after configuring the "virtual boardroom," and after establishing the conference session, the display 124 of the session client can present the representations 126 of a number of the participants 72 based upon a state of the respective participants in the session, as shown in block 106. More particularly, for example, the session client can determine or otherwise be notified (by, e.g., conferencing server 24) of the identit(ies) of the host participant, muted participants, participants joining an established conference, participants that joined and then closed their connection to an established conference, or the like. The session client can then present the representations of the respective participants based on the particular state of those participants.

In addition, the session client 78 can determine or otherwise be notified (by, e.g., session manager 80) of the identity of the speaking participant, such as in the manner explained above, as shown in block 108. The session client can then present, on the display 124, the identity of the speaking participant, such as by presenting the representation of the speaking participant based upon the speaking state of the respective participant, as shown in block 110. Similar to presenting the representations of the participants 72 based on other states of the participants, the session client can present the speaking participant representation in any of a number of different manners. For example, the session client can present the speaking participant by altering the speaking participant representation, such as by changing the color of the representation to a predefined color (e.g., green) reflecting the speaking participant.

In addition to or in lieu of presenting the identity of the speaking participant 72 on the display 124, the session client 78 can be capable of outputting voice communication on the channel(s) associated with the speaking participant, as shown in block 112. Accordingly, the voice communication can be heard via the speakers 134 of the participant device receiving voice communication from the respective channel(s). For example, if the speaking participant is associated with a first audio channel, the voice communication can be output on the first audio channel for receipt by speaker(s) configured for receiving audio from the first audio channel, the speaker(s) outputting the voice communication.

Irrespective of how the "virtual boardroom" of the session client 78 presents the participants 72 of the conference session, the session can then continue with the session client of the participants continuing to present the participants of the conference session, as shown in block 114. In this regard, the session client can continue by updating or otherwise modifying the representations of the participants and/or the voice communication received during the conference session as the state of the participants change during the session, as shown in blocks 116 and 118. Then, similar to before, at one or more points during the conference session, one or more participants may desire to end the conference session. At such instances, then, those participants can close their connection to the conference session, as shown in block 120. Closing the conference session, then, may close the communication sessions previously established between the participants and the conferencing server 24.

To further illustrate this aspect of the present invention, consider, for example, the "virtual boardroom" display presentation of FIG. 7 for a host participant of a conference session, where a conference session includes four participants 72, "caller A," "caller B," "caller C," and "caller D." In such an instance, the host of the conference (e.g., caller D) can configure their device such that the host caller D is presented at the bottom of a representation of a board table 128. The host can then place the other representations such that the representations of callers A and C are placed to the left and right of the host caller D, respectively, and the representation of caller B is placed across the table from caller D. Also consider, for example, that callers A and C are associated with left and right audio channels, respectively, for providing voice communication to left and right speakers 134a and 134b, respectively. Further, for example, callers B and D are both associated with both the left and right audio channels, although caller B is further associated with audio processing to provide the effect that audio output is originating from a point spatially in front of, but farther away from, the host.

Figure 8A:
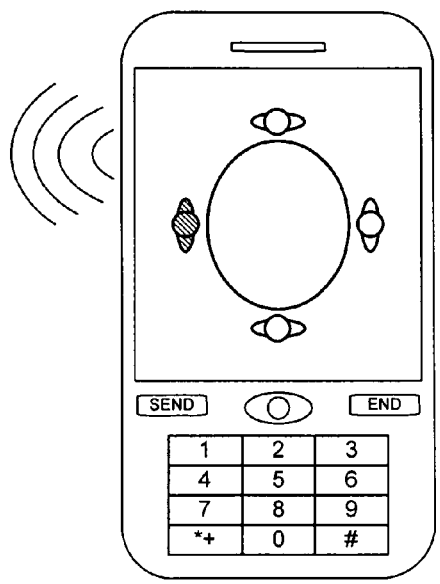
Figure 8B:
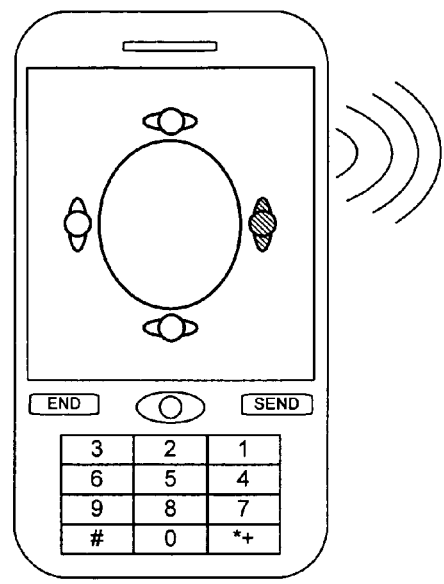
Figure 8C:
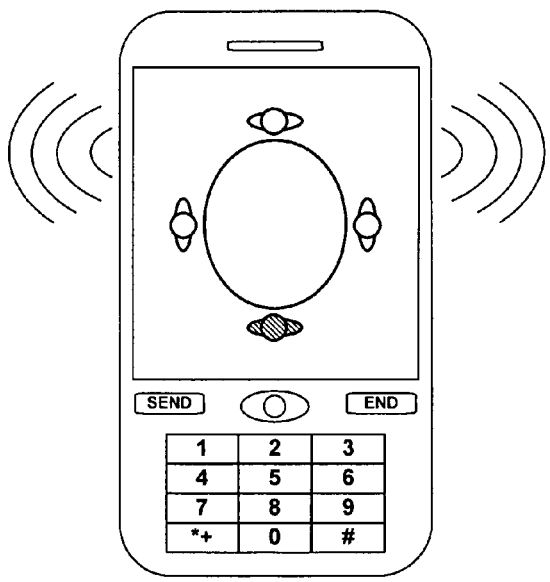
Figure 8D:
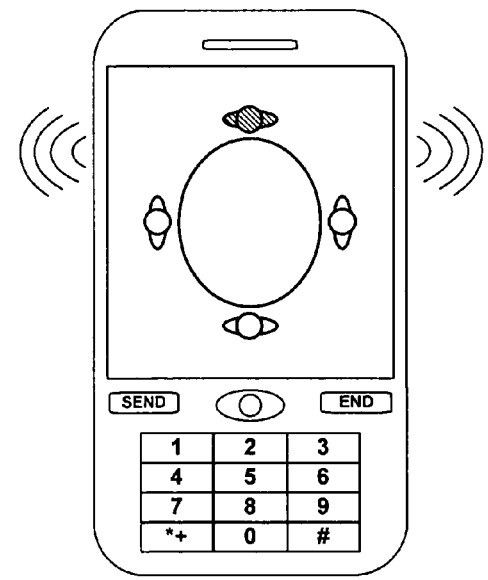

From the above example, consider effectuating a conference session whereby caller A is identified as the speaking participant. In such an instance, the color of the representation of caller A 126a can change to reflect caller A as the speaking participant, as shown in FIG. 8a. In addition, voice communication while caller A is identified as the speaking participant can be output on the left channel and thus the left speaker 134a of the participant device. Similarly, when caller C is speaking, the representation of caller C 126c can change to reflect caller C as the speaking participant, and voice communication can be output on the right channel and thus the right speaker 134b, as shown in FIG. 8b. When caller D is speaking, the representation of caller D 126d can change to reflect caller D is the speaking participant, and the voice communication can be output on both the left and right channels and thus both the left and right speakers, as shown in FIG. 8c. And when caller B is speaking, the representation of caller B 126b can change to reflect caller B is the speaking participant, and the voice communication can be processed and output on both the left and right channels and thus both the left and right speakers, as shown in FIG. 8d. In this regard, the voice communication when caller B is speaking can be processed such that the output voice communication has the effect of originating from a distance in front of the respective host participant D's device. The conference can continue in this manner, with the representations of the participants being presented based upon a current state of the respective participants, including whether the participant is identified as the speaking participant. Similarly, the voice communication can be presented based upon a current state of the participants, particularly the speaking participant.

According to one aspect of the present invention, the functions performed by one or more of the entities of the system, such as the participants 72 (e.g., terminal 10, computing system 22, etc.) and/or conferencing server 24 may be performed by various means, such as hardware and/or firmware, including those described above, alone and/or under control of a computer program product (e.g., session clients 78, session manager 80, etc.). The computer program product for performing one or more functions of embodiments of the present invention includes a computer-readable storage medium, such as the non-volatile storage medium, and software including computer-readable program code portions, such as a series of computer instructions, embodied in the computer-readable storage medium.

In this regard, FIGS. 5 and 6 are flowcharts of methods, systems and program products according to the invention. It will be understood that each block or step of the flowcharts, and combinations of blocks in the flowcharts, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts' block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts' block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts' block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor operable or effectuating a conference session between a plurality of participants at a plurality of remote locations, the processor being configured to receive a plurality of audio measurements representative of audio levels adjacent respective participants of the conference session, at least one of the audio measurements being received from a proximity network including a plurality of participants at one of the remote locations, the audio measurement from the proximity network having been identified to be highest from among the audio measurements of the participants in the proximity network,
wherein the processor is configured to compare the audio measurements to identify the highest session measurement, the participant associated with the highest session measurement being identified as a speaking participant, and
wherein the processor is configured to transfer the identity of the speaking participant to at least some of the participants of the conference session.

2. An apparatus according to claim 1, wherein the processor is configured to receive at least one of the audio measurements from a proximity network including a plurality of participants, at least one of the participants of the proximity network operating as a master, and at least one of the participants of the proximity network operating as a slave, the audio measurement from the proximity network having been identified as a highest audio measurement by:
obtaining an audio measurement representative of an audio level adjacent the master;
receiving audio measurements representative of audio levels adjacent the slaves; and
comparing the audio measurements of the master and slaves to thereby identify the highest audio measurement of the proximity network.

3. An apparatus according to claim 1, wherein at least some of the participants include a display configured to present representations of at least some of the participants spatially organized on the display, and
wherein the processor is configured to transfer the identity of the speaking participant to thereby enable the participants receiving the identity and including the display to present the identity by presenting the representation of the respective participant based upon a speaking state of the respective participant.

4. An apparatus according to claim 1, wherein the participants exchange voice communication during the conference session, wherein at least some of the participants are associated with at least one audio channel for providing the exchanged voice communication to at least one speaker, and
wherein the processor is configured to transfer the identity of the speaking participant to thereby enable the participants receiving the identity to present the identity by outputting the exchanged voice communication on the at least one audio channel associated with the speaking participant to thereby provide the exchanged voice communication to the respective at least one speaker.

5. An apparatus according to claim 4, wherein at least some of the participants associated with at least one audio channel also includes a display configured to present representations of at least some of the participants spatially organized in a plurality of areas of the display, wherein at least some of the participants are associated with at least one audio channel by associating at least some of the areas of the display with at least one audio channel to thereby associate the participants with representations in the areas of the display with the respective at least one audio channel, and
wherein the processor is configured to transfer the identity of the speaking participant to thereby enable the participants receiving the identity and including the display to present the identity by further presenting the representation of the respective participant based upon a speaking state of the respective participant.

6. An apparatus comprising:
a processor configured to effectuate a conference session between a plurality of participants at at least one remote location, the participants exchanging voice communication during the conference session, the processor being configured to associate at least some of the participants with at least one of a plurality of audio channels selectable for providing the exchanged voice communication to at least one speaker at a remote location,
wherein the processor is configured to receive the identity of the speaking participant, including being configured to:
obtain an audio measurement representative of an audio level adjacent a participant;
transfer the audio measurement to thereby enable a session manager to identify the speaking participant at least partially based upon the audio measurement, the session manager being enabled to identify the speaking participant by:
receiving a plurality of audio measurements representative of audio levels adjacent respective participants, at least one of the audio measurements being received from a proximity network including a plurality of participants at one of the remote locations, the audio measurement from the proximity network having been identified to be highest from among the audio measurements of the participants in the proximity network; and
comparing the audio measurements to identify the highest session measurement, the participant associated with the highest session measurement being identified as a speaking participant; and
receive the identity of the speaking participant from the session manager, and
wherein the processor is configured to present the identity of the speaking participant by outputting the exchanged voice communication on the at least one audio channel associated with the speaking participant to thereby provide the exchanged voice communication to the respective at least one speaker.

7. An apparatus according to claim 6, wherein the processor is configured to present representations of at least some of the participants spatially organized in a plurality of areas of a display,
wherein the processor is configured to associate at least some of the areas of the display with at least one audio channel to thereby associate the participants with representations in the areas of the display with the respective at least one audio channel, and
wherein the processor is configured to present the identity of the speaking participant by further presenting the representation of the respective participant based upon a speaking state of the respective participant.

8. An apparatus according to claim 6, wherein the processor is configured to transfer the audio measurement to thereby enable the session manager to identify the speaking participant by receiving at least one of the audio measurements from a proximity network including a plurality of participants, at least one of the participants of the proximity network operating as a master, and at least one of the participants of the proximity network operating as a slave, the audio measurement from the proximity network having been identified as a highest audio measurement by:

obtaining an audio measurement representative of an audio level adjacent the master;

receiving audio measurements representative of audio levels adjacent the slaves; and comparing the audio measurements of the master and slaves to thereby identify the highest audio measurement of the proximity network.

9. A method of effectuating a conference session between a plurality of participants at a plurality of remote locations, the method comprising:

receiving a plurality of audio measurements representative of audio levels adjacent respective participants of the conference session, at least one of the audio measurements being received from a proximity network including a plurality of participants at one of the remote locations, the audio measurement from the proximity network having been identified to be highest from among the audio measurements of the participants in the proximity network;

comparing the audio measurements to identify the highest session measurement, the participant associated with the highest session measurement being identified as a speaking participant; and transferring the identity of the speaking participant to at least some of the participants of the conference session.

10. A method according to claim 9, wherein the receiving a plurality of audio measurements comprises receiving at least one of the audio measurements from a proximity network including a plurality of participants, at least one of the participants of the proximity network operating as a master, and at least one of the participants of the proximity network operating as a slave, the audio measurement from the proximity network having been identified as a highest audio measurement by:

obtaining an audio measurement representative of an audio level adjacent the master;

receiving audio measurements representative of audio levels adjacent the slaves; and comparing the audio measurements of the master and slaves to thereby identify the highest audio measurement of the proximity network.

11. A method according to claim 9, wherein at least some of the participants include a display configured to present representations of at least some of the participants spatially organized on the display, and wherein the transferring the identity comprises transferring the identity of the speaking participant to thereby enable the participants receiving the identity and including the display are to present the identity by presenting the representation of the respective participant based upon a speaking state of the respective participant.

12. A method according to claim 9, wherein the participants exchange voice communication during the conference session, wherein at least some of the participants are associated with at least one audio channel for providing the exchanged voice communication to at least one speaker, and wherein the transferring the identity comprises transferring the identity of the speaking participant to thereby enable the participants receiving the identity are to present the identity by outputting the exchanged voice communication on the at least one audio channel associated with the speaking participant to thereby provide the exchanged voice communication to the respective at least one speaker.

13. A method according to claim 12, wherein at least some of the participants associated with at least one audio channel also includes a display configured to present representations of at least some of the participants spatially organized in a plurality of areas of the display, wherein at least some of the participants are associated with at least one audio channel by associating at least some of the areas of the display with at least one audio channel to thereby associate the participants with representations in the areas of the display with the respective at least one audio channel, and wherein the transferring the identity comprises transferring the identity of the speaking participant to thereby enable the participants receiving the identity and including the display to further present the representation of the respective participant based upon a speaking state of the respective participant.

14. A method of effectuating a conference session between a plurality of participants at at least one remote location, the participants exchanging voice communication during the conference session, the method comprising:

associating at least some of the participants with at least one of a plurality of audio channels selectable for providing the exchanged voice communication to at least one speaker at a remote location;

receiving an identity of a speaking participant, wherein the receiving an identity comprises:

obtaining an audio measurement representative of an audio level adjacent a participant;

transferring the audio measurement to thereby enable a network entity to identify the speaking participant at least partially based upon the audio measurement, the network entity being configured to identify the speaking participant by:

receiving a plurality of audio measurements representative of audio levels adjacent respective participants, at least one of the audio measurements being received from a proximity network including a plurality of participants at one of the remote locations, the audio measurement from the proximity network having been identified to be highest from among the audio measurements of the participants in the proximity network; and comparing the audio measurements to identify the highest session measurement, the participant associated with the highest session measurement being identified as a speaking participant; and receiving the identity of the speaking participant from the network entity; and presenting the identity of the speaking participant by outputting the exchanged voice communication on the at least one audio channel associated with the speaking participant to thereby provide the exchanged voice communication to the respective at least one speaker.

15. A method according to claim 14, wherein a display is configured to present representations of at least some of the participants spatially organized in a plurality of areas of the display, wherein the associating at least some of the participants comprises associating at least some of the areas of the display with at least one audio channel to thereby associate the participants with representations in the areas of the display with the respective at least one audio channel, and wherein the presenting the identity further comprises presenting the representation of the respective participant based upon a speaking state of the respective participant.

16. A method according to claim 14, wherein the transferring the audio measurement comprises transferring the audio measurement to thereby enable the network entity to identify the speaking participant by receiving at least one of the audio measurements from a proximity network including a plurality of participants, at least one of the participants of the proximity network operating as a master, and at least one of the participants of the proximity network operating as a slave, the audio measurement from the proximity network having been identified as a highest audio measurement by:

obtaining an audio measurement representative of an audio level adjacent the master;

receiving audio measurements representative of audio levels adjacent the slaves; and comparing the audio measurements of the master and slaves to thereby identify the highest audio measurement of the proximity network.

17. A computer program product for effectuating a conference session between a plurality of participants at a plurality of remote locations, the computer program product comprising at least one computer-readable storage medium having computer-readable program code portions stored therein, the computer-readable program code portions comprising:

a first executable portion for receiving a plurality of audio measurements representative of audio levels adjacent respective participants of the conference session, at least one of the audio measurements being received from a proximity network including a plurality of participants at one of the remote locations, the audio measurement from the proximity network having been identified to be highest from among the audio measurements of the participants in the proximity network;

a second executable portion for comparing the audio measurements to identify the highest session measurement, the participant associated with the highest session measurement being identified as a speaking participant; and a third executable portion for transferring the identity of the speaking participant to at least some of the participants of the conference session.

18. A computer program product according to claim 17, wherein the first executable portion is configured to receive at least one of the audio measurements from a proximity network including a plurality of participants, at least one of the participants of the proximity network operating as a master, and at least one of the participants of the proximity network operating as a slave, the audio measurement from the proximity network having been identified as a highest audio measurement by the first executable portion which is configured to:

obtain an audio measurement representative of an audio level adjacent the master;

receive audio measurements representative of audio levels adjacent the slaves; and compare the audio measurements of the master and slaves to thereby identify the highest audio measurement of the proximity network.

19. A computer program product according to claim 17, wherein at least some of the participants include a display configured to present representations of at least some of the participants spatially organized on the display, and wherein the third executable portion is configured to transfer the identity of the speaking participant to thereby enable the participants receiving the identity and including the display to present the identity by presenting the representation of the respective participant based upon a speaking state of the respective participant.

20. A computer program product according to claim 17, wherein the participants exchange voice communication during the conference session, wherein at least some of the participants are associated with at least one audio channel for providing the exchanged voice communication to at least one speaker, and wherein the third executable portion is configured to transfer the identity of the speaking participant to thereby enable the participants receiving the identity to present the identity by outputting the exchanged voice communication on the at least one audio channel associated with the speaking participant to thereby provide the exchanged voice communication to the respective at least one speaker.

21. A computer program product according to claim 20, wherein at least some of the participants associated with at least one audio channel also includes a display configured to present representations of at least some of the participants spatially organized in a plurality of areas of the display, wherein at least some of the participants are associated with at least one audio channel by associating at least some of the areas of the display with at least one audio channel to thereby associate the participants with representations in the areas of the display with the respective at least one audio channel, and wherein the third executable portion is configured to transfer the identity of the speaking participant to thereby enable the participants receiving the identity and including the display to present the identity by further presenting the representation of the respective participant based upon a speaking state of the respective participant.

22. A computer program product for effectuating a conference session between a plurality of participants at at least one remote location, the computer program product comprising at least one computer-readable storage medium having computer-readable program code portions stored therein, the computer-readable program code portions comprising:

a first executable portion configured to associate at least some of the participants with at least one of a plurality of audio channels selectable for providing the exchanged voice communication to at least one speaker at a remote location;

a second executable portion configured to receive an identity of a speaking participant including being configured to:

obtain an audio measurement representative of an audio level adjacent a participant;

transfer the audio measurement to thereby enable a network entity to identify the speaking participant at least partially based upon the audio measurement, the network entity being enabled to identify the speaking participant by:

receiving a plurality of audio measurements representative of audio levels adjacent respective participants, at least one of the audio measurements being received from a proximity network including a plurality of participants at one of the remote locations, the audio measurement from the proximity network having been identified to be highest from among the audio measurements of the participants in the proximity network; and comparing the audio measurements to identify the highest session measurement, the participant associated with the highest session measurement being identified as a speaking participant; and receive the identity of the speaking participant from the network entity; and a third executable portion configured to present the identity of the speaking participant by outputting the exchanged voice communication on the at least one audio channel associated with the speaking participant to thereby provide the exchanged voice communication to the respective at least one speaker.

23. A computer program product according to claim 22 wherein a display is configured to present representations of at least some of the participants spatially organized in a plurality of areas of the display, wherein the first executable portion is configured to associate at least some of the areas of the display with at least one audio channel to thereby associate the participants with representations in the areas of the display with the respective at least one audio channel, and wherein the third executable portion is configured to present the identity of the speaking participant by further presenting the representation of the respective participant based upon a speaking state of the respective participant.

24. A computer program product according to claim 22, wherein the second executable portion is configured to transfer the audio measurement to thereby enable the network entity to identify the speaking participant by receiving at least one of the audio measurements from a proximity network including a plurality of participants, at least one of the participants of the proximity network operating as a master, and at least one of the participants of the proximity network operating as a slave, the audio measurement from the proximity network having been identified as a highest audio measurement by:

obtaining an audio measurement representative of an audio level adjacent the master;

receiving audio measurements representative of audio levels adjacent the slaves; and comparing the audio measurements of the master and slaves to thereby identify the highest audio measurement of the proximity network.

* * * * *

UNITED STATES PATENT AND TRADEMARK OFFICE
CERTIFICATE OF CORRECTION

PATENT NO. : 7,489,772 B2  Page 1 of 1
APPLICATION NO. : 11/322915
DATED : February 10, 2009
INVENTOR(S) : Szomolanyi et al.

It is certified that error appears in the above-identified patent and that said Letters Patent is hereby corrected as shown below:

<u>Column 19,</u>

Line 3, "or" should read --for--.

Signed and Sealed this

Fifth Day of May, 2009

JOHN DOLL
*Acting Director of the United States Patent and Trademark Office*